Patented Oct. 5, 1937

2,094,939

UNITED STATES PATENT OFFICE 2,094,939

PROCESS FOR THE PREPARATION OF STABLE COLLOIDAL SULPHUR

Edgar Boulogne, Lambersart, Nord, France, assignor to Societe Industrielle des Derives du Soufre, Nord, France, and himself No Drawing. Application November 24, 1936, Serial No. 112,605. In France June 17, 1936

1 Claim. (Cl. 23—224)

It is a known fact that sulphur can be dissolved in various proportions in solutions of caustic alkalies to form polysulphides.

It is further known that the decomposition of such polysulphides by an acid will restore, in addition to the salt corresponding to the alkali metal and the acid employed, the yellow sulphur to the elementary state, after it has passed through the transitory form of white colloidal sulphur. Hitherto, it has not been possible to limit this transformation in order to obtain the whole of the sulphur in this colloidal state in a stable manner.

It has been found that excellent results can be obtained by operating in the following conditions;

1. The solution of sulphur in the alkali should be as concentrated as possible, but should be entirely free from undissolved particles of sulphur, as the presence of such particles will bring about the precipitation of the sulphur in the elementary state.

2. By decomposing the solution of sulphur in the alkali by sulphur dioxide, liquefied or gaseous, and entirely free from oxygen or carbon dioxide, since these two substances, together or separately, will also cause the settling of the sulphur in the elementary state.

3. During the addition of the sulphur dioxide, the temperature should not exceed 60° C., also to avoid the undesirable precipitation of the elementary sulphur.

The present invention has for its object a process which takes due account of the aforesaid conditions and which permits of obtaining, from the polysulphides obtained by dissolving elementary sulphur in solutions of caustic alkalies, the whole of the sulphur of such polysulphides in the state of a stable colloidal suspension.

According to the invention the process consists in treating the solution of sulphur in an alkaline lye which is entirely free from particles of solid sulphur, by sulphur dioxide which is entirely free from oxygen and carbon dioxide, at a temperature not exceeding 60° C.

It has been further observed that it is advantageous to introduce the sulphur dioxide in an extremely rapid manner, and this can be most readily effected by the use of liquefied sulphur dioxide, which expands in the mass and thus also serves for the cooling of the said mass. Whatever be the quantity of sulphur dioxide employed, the quantity of sulphur which is deposited will depend upon the greater or less speed of the introduction thereof.

When the essential conditions above indicated have been complied with, there is obtained a milk of sulphur which passes entirely through the pores of a paper filter. When observed under the microscope, there is found an entire absence of sulphur crystals, while with the ultra-microscope, there is observed a very great number of minute particles having the Brownian movement.

The stability of the suspension, which is already considerable in itself, may be maintained indefinitely by the addition—previous to the introduction of the sulphur dioxide—of a protecting colloid upon which alkalies, sulphur, sulphur dioxide, or hydrogen sulphide, have no action contrary to the maintenance of the colloidal state.

As a subsidiary measure to this additional maintenance of the colloidal state, the mixture can be purified and concentrated.

By way of example, a description will be given of the method of preparation. Use is made of a receptacle of suitable capacity which may be heated and cooled, and may be agitated and connected to a source of vacuum, and in this is placed 200 kgs. of a soda solution at 35% NaOH, and 112 kgs. of crude sulphur. This is heated to 110° C. until the sulphur is entirely dissolved. Then cool to 20°, and add (if necessary) the protecting colloid, after making sure that the sulphur has been entirely dissolved and that no precipitation has occurred after cooling. If required, the whole is carefully filtered.

Then, during seven minutes, add 65 kgs. of liquefied sulphur dioxide, or the volume corresponding to this weight, of gaseous sulphur dioxide diluted by nitrogen or any other gas except oxygen and carbon dioxide. The cooling should take place in such manner that the temperature at the end of the operation shall be 60° C. at the maximum.

The small quantity of hydrogen sulphide which is set free when one-half of the sulphur dioxide has been added, is removed by the vacuum.

At the end of the addition of the sulphur dioxide, the cooling is stopped, and the vacuum is maintained for about one hour in order to remove the last traces of sulphur dioxide which have remained in solution.

The product which is obtained in these conditions contains 50 parts of colloidal sulphur per 100 parts of dry material, the remainder consisting largely of sodium sulphite.

Obviously, the said invention is not limited to the embodiment herein described, and the proportions indicated, and the nature of the alkali and of the sulphur, given by way of example, are not limitative and are susceptible of modifications without departing from the principle of the invention.

Having now described my invention what I claim as new and desire to secure by Letters Patent is:

A process for preparing colloidal sulphur which consists in forming polysulphides by dissolving elementary sulphur in a solution of caustic alkalies, in sending at high speed into said solution containing the polysulphides a current of liquid sulphur dioxide, entirely free from oxygen and carbon dioxide, which expands in said solution, at a temperature not exceeding 60° C.

EDGAR BOULOGNE.